US012608344B2

(12) United States Patent
Anand et al.

(10) Patent No.: US 12,608,344 B2
(45) Date of Patent: Apr. 21, 2026

(54) MESSAGING DEDPULICATION IN PUBLISH / SUBSCRIBE SYSTEM

(71) Applicant: Databricks, Inc., San Francisco, CA (US)

(72) Inventors: Pranav Anand, New York City, NY (US); Praveen Gattu, Sammamish, WA (US); Anish Shrigondekar, San Jose, CA (US); Huanli Wang, Redmond, WA (US)

(73) Assignee: Databricks, Inc., San Francisco, CA (US)

( * ) Notice: Subject to any disclaimer, the term of this patent is extended or adjusted under 35 U.S.C. 154(b) by 39 days.

(21) Appl. No.: 18/224,981

(22) Filed: Jul. 21, 2023

(65) Prior Publication Data

US 2025/0028686 A1     Jan. 23, 2025

(51) Int. Cl.
*G06F 16/174* (2019.01)
*G06F 16/14* (2019.01)
*G06F 16/16* (2019.01)

(52) U.S. Cl.
CPC .......... *G06F 16/1748* (2019.01); *G06F 16/14* (2019.01); *G06F 16/164* (2019.01)

(58) Field of Classification Search
CPC ..... G06F 16/1748; G06F 16/164; G06F 16/14
USPC ........................................................ 707/692
See application file for complete search history.

(56) References Cited

U.S. PATENT DOCUMENTS

| | | | | |
|---|---|---|---|---|
| 8,180,739 B2 * | 5/2012 | Arditi | ............... | G06F 16/24568 |
| | | | | 707/802 |
| 9,928,274 B2 * | 3/2018 | Purcell | ................. | G06F 16/2453 |
| 2016/0366221 A1 * | 12/2016 | Palmeri | ................. | H04L 63/166 |
| 2020/0076881 A1 * | 3/2020 | Ni | ............................ | H04L 67/55 |
| 2020/0327102 A1 * | 10/2020 | Zhang | ................. | G06F 16/2358 |
| 2022/0043787 A1 * | 2/2022 | Kondiles | ............. | G06F 16/2379 |
| 2022/0138168 A1 * | 5/2022 | Veselova | ........... | G06F 16/24532 |
| | | | | 707/692 |

OTHER PUBLICATIONS

Azeroual, Otmane, et al., "A Record Linkage-Based Deduplication Framework with DataCleaner Extension", Multimodal Technologies and Interaction, vol. 6, Issue 4, Article 27, Apr. 11, 2022, pp. 1-18.*
Yang, Ru, et al., "Boosting the Restoring Performance of Deduplication Data by Classifying Backup Metadata", ACM/IMS Transactions on Data Science, vol. 2, No. 2, Article 13, Apr. 2021, pp. 1-16.*

* cited by examiner

*Primary Examiner* — Robert Stevens
(74) *Attorney, Agent, or Firm* — Fenwick& West LLP

(57) ABSTRACT

A device for using message identifiers for Publish/subscribe messaging deduplication is described. The system may fetch one or more sets of data records from a data source, and each data record is associated with a message identifier. The system may store the one or more sets of data records in a data file, which is associated with a metadata comprising the message identifier, a file path and a row number for each data record. The system may determine whether one or more of the data records are duplicated based on the associated message identifiers. In response to determining that the one or more data records are duplicated, the system may generate a second metadata comprising the file paths and row numbers associated with the duplicated data records.

17 Claims, 7 Drawing Sheets

Fetch one or more sets of data records from a data source
610

Store the one or more sets of data records in a data file
620

Determine whether one or more of the data records are duplicated based on the associated message identifiers
630

Generate a second metadata associated with the duplicated data records
640

MESSAGING DEDPULICATION IN PUBLISH / SUBSCRIBE SYSTEM

TECHNICAL FIELD

The disclosed configuration relates generally to data storage technology, and more particularly to data deduplication.

BACKGROUND

A data processing service may manage a significant amount of data for one or more entities in various forms, such as raw data or data tables. Users access the data processing service to perform operations (e.g., a query operation) on the data. To return the results of the operations to the users, the data processing service may need to access remote data sources through a publish/subscribe (Pub/Sub) messaging service. However, the Pub/Sub does not keep track of the messages that have been sent. A message may be delivered in any order, and the data processing service is not able to request the Pub/Sub to send specific messages. Often the Pub/Sub resends messages that already were previously sent. Re-sending messages consumes unnecessary system resources and adds complexity due to data duplication in the data processing service.

Figure 1:
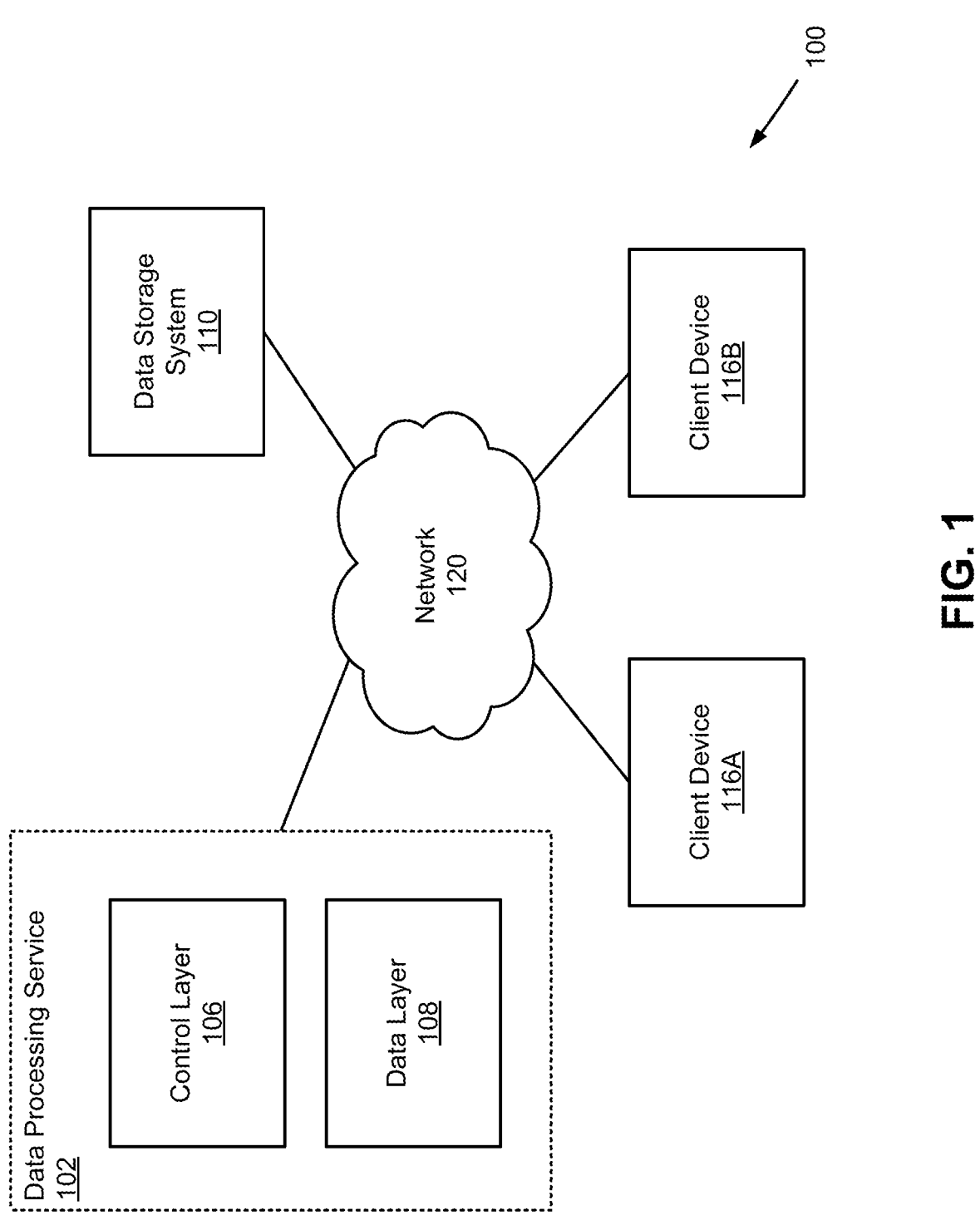
FIG. 1 is a high-level block diagram of a system environment for a data processing service, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

The disclosed configurations beneficially include a system (and/or a method) for using message identifiers for data deduplication. By way of example, a system may retrieve (or fetch) one or more sets of data records from a data source, and each data record is associated with a message identifier. The system may subscribe to a data source and fetches the data records using a publish/subscribe (Pub/Sub) messaging service. The system may store the fetched one or more sets of data records in a data file, which is associated with a metadata comprising the message identifier, a file path and a row number for each data record. The system may determine whether one or more of the data records are duplicated based on the associated message identifiers. In response to determining that the one or more data records are duplicated, the system may generate a second metadata comprising the file paths and row numbers associated with the duplicated data records. In some embodiments, the system may use the second metadata to generate a deletion vector to indicate the duplication status of the corresponding data records. When the system receives an operation request on a set of data records from a client device, the system may use the deletion vector to determine whether the set of data records includes any duplicated data records and performs the operation based on the results of the determination.

The disclosed method addresses the problem of the data duplication associated with the Pub/Sub messaging service. By using the message identifiers that are associated with the data records, the configuration keeps track of the fetched data records and stores their corresponding duplication status. In this way, the configuration provides no offset tracking and minimizes the need for management of resources external to the Pub/Sub message streaming or any guarantees about duplicates even after records have been processed. It also reduces the operation load on the duplicated data records, saving resources and cost for both the data processing service and the users of the data processing service.

Referring now to Figure (FIG.) 1, illustrated is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in relation to FIG. 4. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Example Data Storage System

Figure 2:
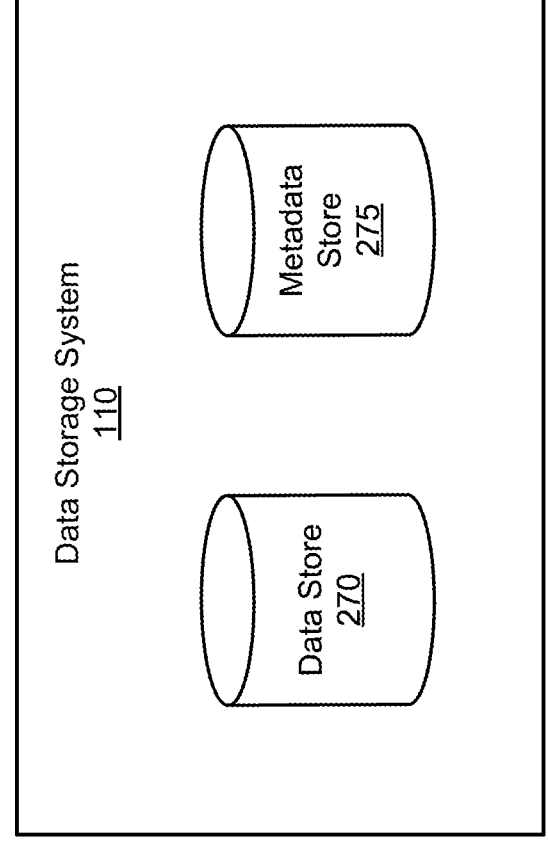
FIG. 2 illustrates a block diagram of an architecture of a data storage system, in accordance with an embodiment.

FIG. 2 is a block diagram of an architecture of a data storage system 110, in accordance with an embodiment. In one embodiment, the data storage system 110 includes a data ingestion module. The data storage system 110 also includes a data store 270 and a metadata store 275.

The data store 270 stores data associated with different tenants of the data processing service 102. The data records that are fetched from data sources may be stored in one or more data files in the data store 270. In one embodiment, each data record is associated with a message identifier (e.g., msgId). The message identifier may be a universal unique identifier (UUID), or any type of identifier that may be used to identify a message/data record. In some embodiments, the data file that contains the data records includes a file path (e.g., FilePath), and each data record may be associated with a row number (e.g., rowNum) in the data file at which the data record is stored. Alternatively, the data record may be identified with other parameters, such as record identifier, etc.

In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

The metadata store 275 stores metadata that is associated with the fetched data records. While the fetched data records are stored in one or more data files, a metadata may be generated for each data file identifying the information associated with the data records and the data file in which the data records are stored. In one example, for a metadata stored in a remote data storage system, the metadata may include a message identifier, a row number, and a file path (e.g., msgId, rowNum, FilePath) for each data record, and the like. For each data file, the corresponding metadata may include a list of message identifiers associated with the data records that are stored in the data file and the corresponding row numbers at which the data records are stored.

In some embodiments, the metadata store 275 may store metadata comprising message identifiers of previously fetched data records. For example, the metadata store 275 may store a list of message identifiers associated with the data records that were fetched from the data sources previously. In one implementation, the executor nodes may access this list of message identifiers for performing deduplication tasks.

In some embodiments, the metadata store 275 may store metadata associated with duplicated data records. The metadata may include row numbers and the file path that the duplicated data records belong to. For example, the metadata may be in a form of (rowNum, FilePath). Further by example, the metadata may be grouped by file path to co-locate the row numbers of duplicated data records for each data file.

In one implementation, the metadata of the duplicated data records may be used to generate a deletion vector to indicate the duplication status of the corresponding data records. Each data file is associated with a deletion vector that includes a plurality of elements, and each element in the deletion vector may correspond to a data record in the data file. Each element may include a value that is configured to indicate a status of a corresponding data record in the data file. Here, the deletion vector may be used to indicate whether a corresponding data record in the data file is duplicated or not. The values in the deletion vector may be updated based on the deduplication result (e.g., the metadata of the duplicated data records) to indicate the duplication status of the corresponding data records.

In some embodiments, the metadata and/or deletion vector that are associated with the duplicated data records may be deleted in a predetermined time period. For example, the metadata and/or deletion vector may be associated with a time to live (TTL) for each generated metadata, which sets up an amount of time that metadata is set to exist. In some embodiments, the metadata that comprises the file paths of the duplicated data records may be deleted once the corresponding data records have been processed.

Figure 3:
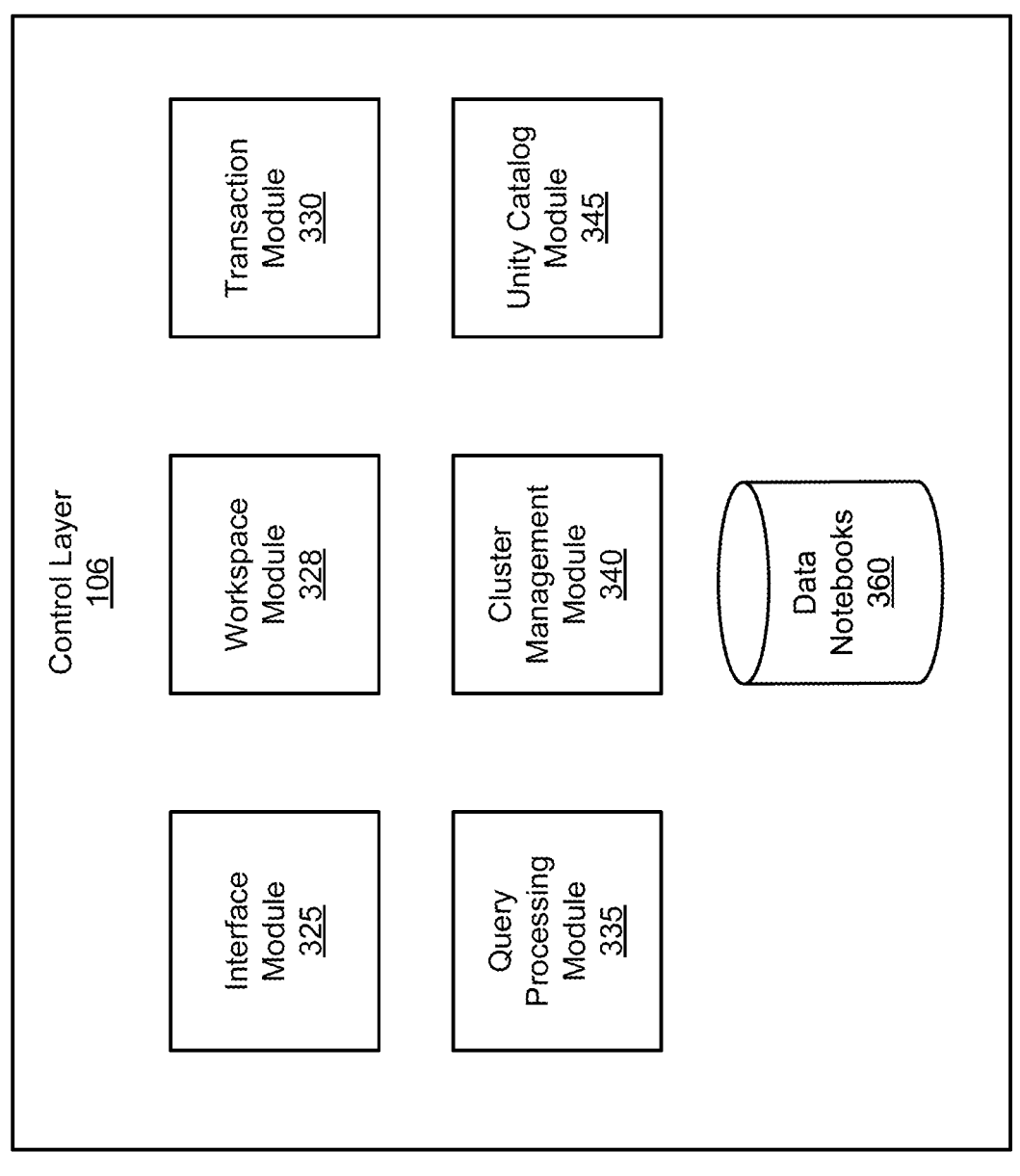
FIG. 3 illustrates a block diagram of an architecture of a control layer, in accordance with an embodiment.

FIG. 3 is a block diagram of an architecture of a control layer 106, in accordance with an embodiment. In one embodiment, the control layer 106 includes an interface module 325, a transaction module 330, a query processing module 335, and a cluster management module 340. The control layer 106 also includes a data notebook store 360. The modules described with FIG. 3 may be structured as program code that configure operation of a computer system, e.g., similar to one have some or all of the components described in FIG. 6, to execute functionality as further described for each module herein.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

Example Cluster Compute System

Figure 4:
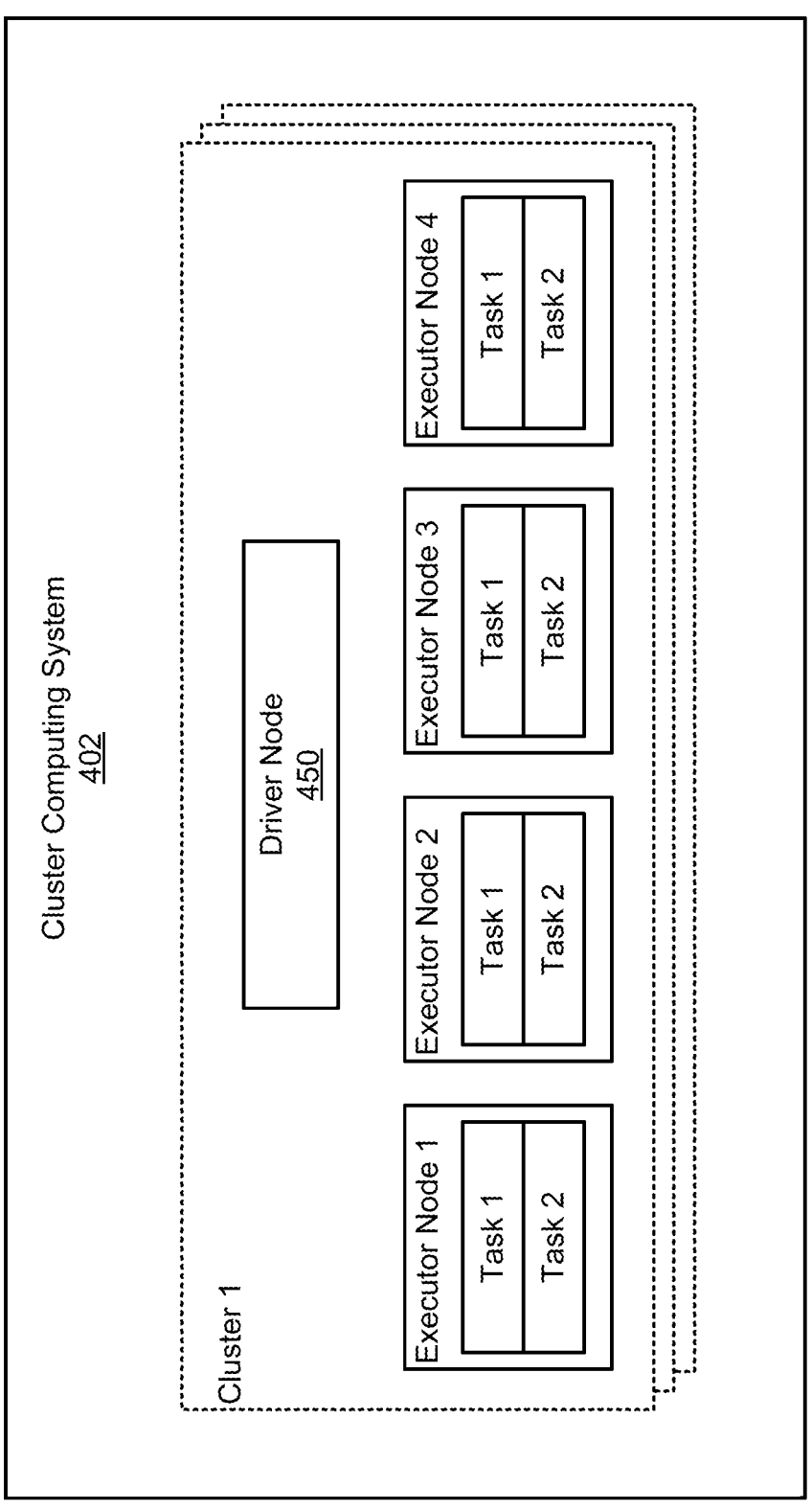
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes described with FIG. 4 may be structured as program code that configure operation of a computer system, e.g., similar to one have some or all of the components described in FIG. 6, to execute functionality as further described for each node herein.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 450. According to an embodiment, an executor node executes the generated code for the database query for a particular subset of data that is processed by the database query. The executor nodes execute the query based on the received information from the driver node 450.

The executor nodes fetch data records from data sources. In some embodiments, the executor nodes may subscribe to the data sources and fetch the data records via a publish/subscribe (pub/sub) messaging service. In one implementation, the executor node may periodically fetch data records from a data source in a predetermined time period. Alternatively, the executor node may fetch the data records upon receiving a notification from the data source. In another implementation, the executor nodes may be scheduled to fetch data records from the data sources for a certain amount of time, or for a certain size of data.

The executor node stores the fetched data records in a data file which is stored in the data storage system 110. In some embodiments, the executor node may transmit to the data source an acknowledge message that is associated with the fetching of the data record. For example, the executor node may transmit the acknowledge message after the data record is successfully fetched and/or stored in the data file. In some embodiments, the acknowledge message may include a timestamp indicating the fetching completion time.

The executor node may generate a metadata that is associated with the data file. The metadata may include a list of message identifiers associated with the fetched data records. The fetched data records are stored in the data file with a file path. The metadata may include the row numbers corresponding to the message identifiers that are stored at the file path. The metadata may include a format, e.g., (msgId, rowNum, FilePath), identifying a message identifier, a file path and a row number for each data record in the data file. In some embodiments, the metadata may include different formats and use different parameters to identify the data record, for example, delivery time, acknowledge identifier, etc.

The executor node performs deduplication tasks on the fetched data records based on message metadata, e.g., the message identifiers. The executor node may access a list of message identifiers from the metadata store 275, and the list of message identifiers are associated with the data records that were fetched from the data sources previously. In some embodiments, the executor node compares the message identifier associated with each of the newly fetched data records against the list of message identifiers. If the executor node identifies that a message identifier of a newly fetched data record matches to an existing message identifier in the list, the executor node determines that the corresponding data record is duplicated, i.e., the data record was fetched from the data source and stored in the data store. Alternatively, if the executor node does not identify that a message identifier of a newly fetched data record matches to any existing message identifier in the list, i.e., the message identifier is "new" to the list, the executor node may determine that the corresponding newly fetched data record is not duplicated. In one implementation, the executor node may add the "new" message identifier to the list of message identifiers to update the list. In this way, the updated list includes the message identifier associated with the newly fetched data record and may be used for future deduplication tasks. In some embodiments, the executor node may update the metadata store with the metadata associated with the newly fetched data record for future deduplication tasks.

The executor node generates a metadata for the duplicated data records. In one implementation, the executor node may generate a metadata comprising row numbers and the file path that the duplicated data records belong to. For example, the generated metadata be in a form of (rowNum, FilePath). The executor node may group by file path to co-locate the row numbers of duplicated data records for each data file. The executor node may further use the metadata of the duplicated data records to generate a deletion vector to indicate the duplication status of the corresponding data records. The executor node may update values in the deletion vector based on the generated metadata to indicate the duplication status of the corresponding data record. The executor node transmits the generated deletion vector to the driver node 450 so that the driver node 450 maintains a list of file paths at which the fetched data records are stored and the deletion vectors for any duplicated records associated with the data files.

Example Driver Node

Figure 5:
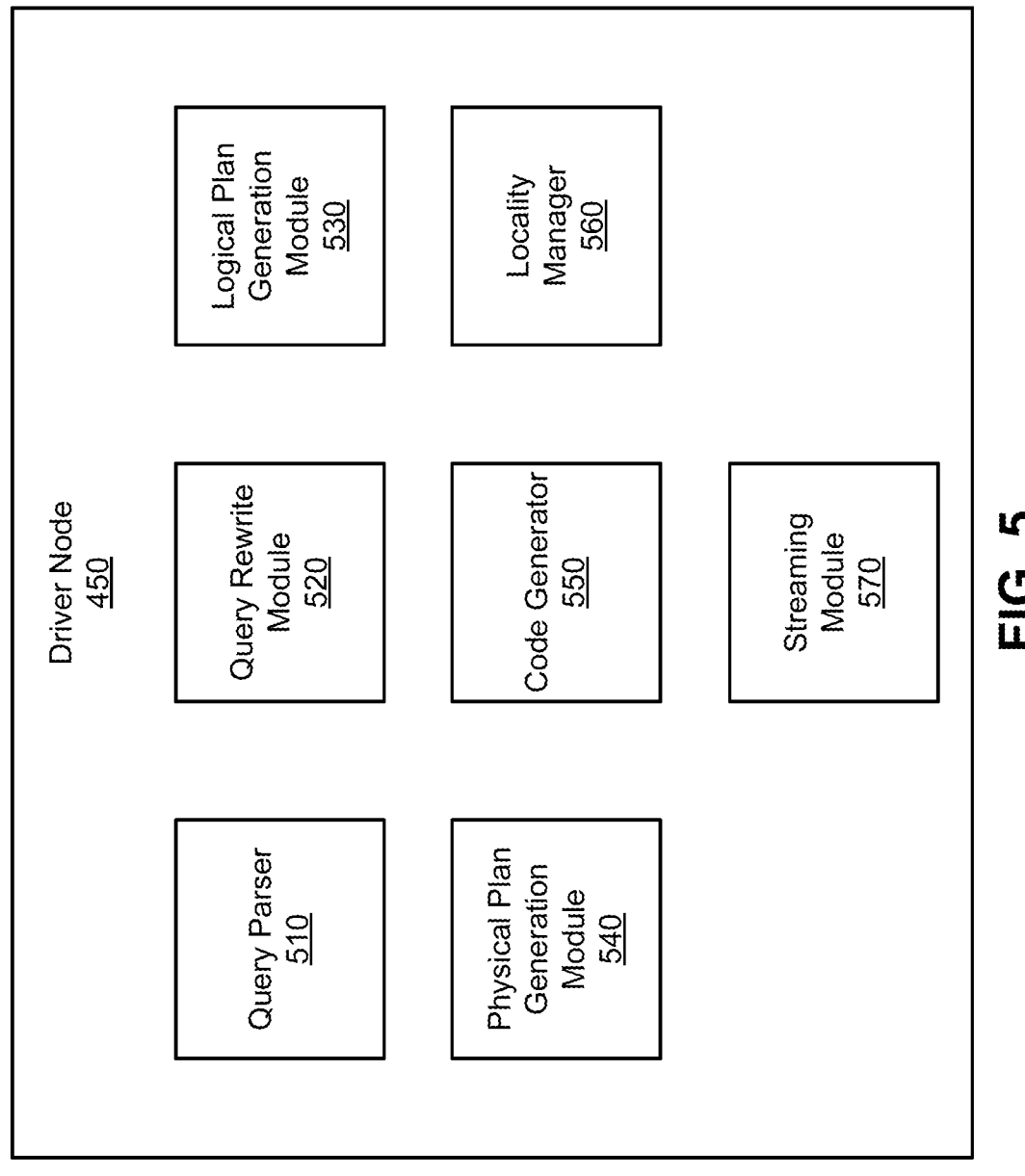
FIG. 5 is a block diagram of an architecture of a driver node, in accordance with an embodiment.

FIG. 5 is a block diagram of an architecture of a driver node 450, in accordance with an embodiment. In one instance, the driver node 450 includes a query parser 510, a query rewrite module 520, a logical plan generation module 530, a physical plan generation module 540, a code generator 550, a locality manager 560, and a streaming module 570. The component described with FIG. 5 may be structured as program code that configure operation of a computer system, e.g., similar to one have some or all of the components described in FIG. 6, to execute functionality as further described for each component herein.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on. According to an embodiment, the data structure representation of the database query is a graph model based on the database query.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query.

The query rewrite module 520 may transform the query to change the order of processing of certain steps, for example, by changing the order in which tables are joined, by changing the order in which certain operations such as filtering of records of a table is performed in relation to other operations. The query rewrite module 520 may transform the database query to cause certain temporary results to be materialized. The query rewrite module 520 may eliminate certain operations if the operations are determined to be redundant. The query rewrite module 520 may transform a database query so that certain computations such as subqueries or expressions are shared. The query rewrite module 520 may transform the database query to pushdown certain computations, for example, by changing the order in which certain predicates are applied to the computation as early as possible. The query rewrite module 520 may transform the database query to modify certain predicates to use more optimized versions of the predicates that are computationally equivalent but provide better performance.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

The code generator 550 generates code representing executable instructions for implementing the physical plan for executing a database query. The generated code includes a set of instructions for each operator specified in the execution plan. The generated code is specified using a programming language that may be compiled and executed.

The locality manager 560 schedules the deduplication tasks for the executor nodes. In some embodiments, the locality manager 560 may schedule the deduplication tasks based on the message identifiers of the data records. The locality manager 560 may use mapping of message identifiers with the identifiers of the executor nodes. For example, message identifiers that belong to a certain hash range may be mapped to a particular executor node and the scheduled executor node performs the deduplication tasks for data records associated with the mapped message identifiers.

The streaming module 570 manages the metadata associated with the fetched data records. For example, after the executor nodes performs the deduplication tasks, the streaming module 570 receives a list of file paths associated with the fetched data records and the deletion vectors for any duplicated records in the corresponding data files. In some embodiments, the streaming module 570 may request the executor nodes to delete the metadata and/or deletion vector that are associated with the duplicated data records in a predetermined time period. The streaming module 570 may determine a time to live (TTL) for each generated metadata. TTL refers to the amount of time that metadata is set to exist. A TTL may be set to be as a preset value. For example, setting the TTL to be seven (7) days, the corresponding metadata will be automatically deleted in seven (7) days from generation. In some embodiments, the streaming module 570 may request the executor nodes to delete the metadata that comprises the file paths of the duplicated data records once the corresponding data records have been processed.

In some embodiments, the streaming module 570 may receive a request from a client device 116 to perform an operation on a set of data records. The locality manager 560 may schedules the executor nodes to identify whether the requested data records are duplicated based on the deletion vector. If a data record is duplicated, the data processing service 102 may skip the operation on the duplicated data record.

Publish/Subscribe Messaging Deduplication Using Message Identifiers

Figure 6:
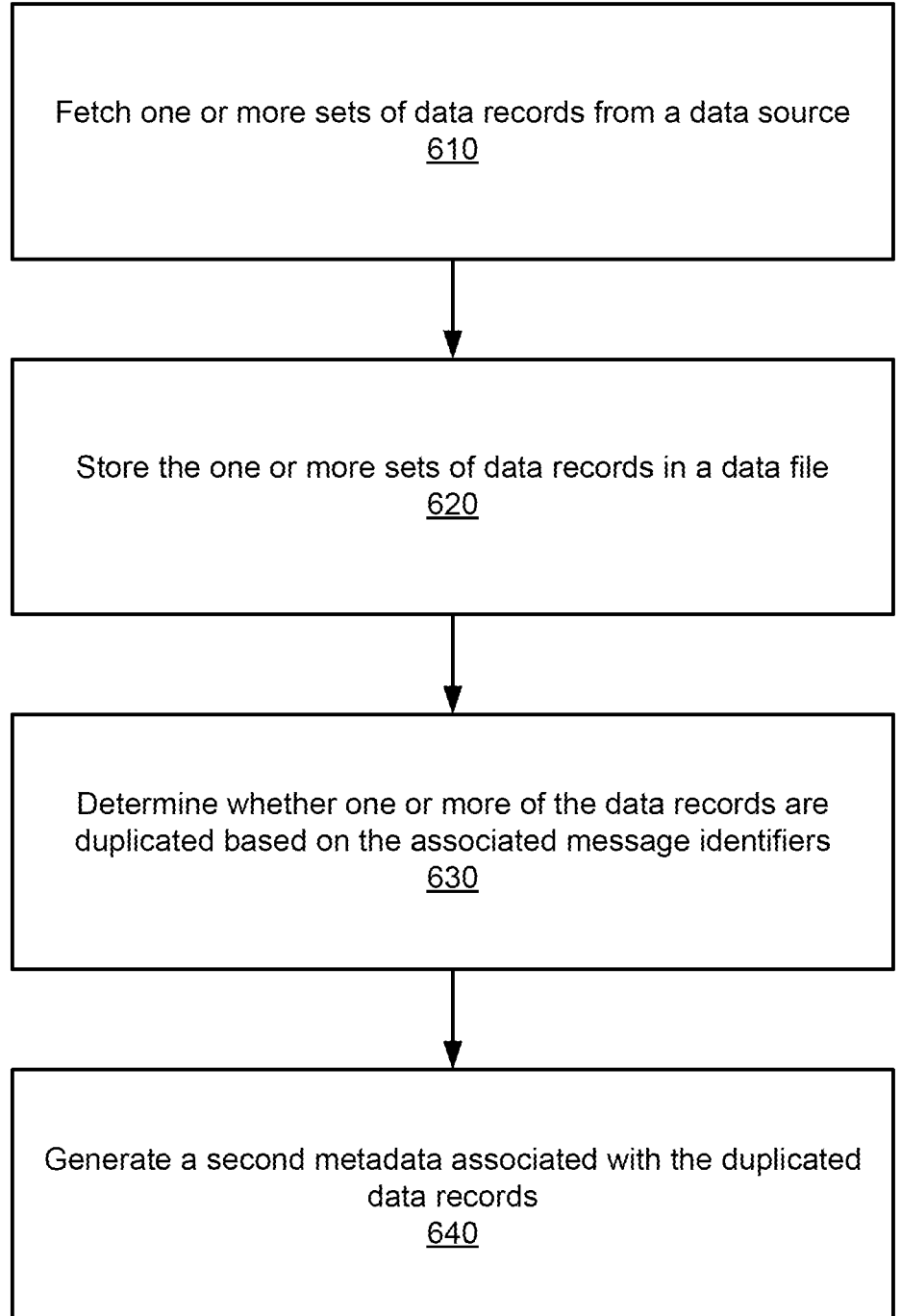
FIG. 6 is a flowchart of a method for using message identifiers for publish/subscribe messaging deduplication, in accordance with an embodiment.

FIG. 6 is a flowchart of a method for using message identifiers for publish/subscribe messaging deduplication, in accordance with an embodiment. The process shown in FIG. 6 may be performed by one or more components (e.g., the control layer 106) of a data processing system/service (e.g., the data processing service 102). Other entities may perform some or all of the steps in FIG. 6. The data processing service 102 as well as the other entities may include some or of the component of the machine (e.g., computer system) described in conjunction with FIG. 7. Embodiments may include different and/or additional steps, or perform the steps in different orders.

The data processing service 102 fetches 610 one or more sets of data records from a data source, each data record associated with a message identifier. In some embodiments, the identifier may be a universal unique identifier (UUID), or any type of identifier that may be used to identify a data record.

In some embodiments, the data processing service 102 may fetch the one or more sets of data records from the data source through a publish/subscribe (Pub/Sub) messaging service. In one implementation, the data processing service 102 may subscribe to the data source and periodically fetch the data records from the data source in a predetermined time period. In another implementation, the data processing service 102 may fetch the data records upon receiving a notification from the data source.

The data processing service 102 stores 620 the one or more sets of data records in a data file. The data file may be stored in a data storage system. In some embodiments, the data storage system may be a cloud storage provided by a user. The data processing service 102 generates a metadata that is associated with the data file, and the metadata may include the message identifier, a file path and a row number for each data record. In some embodiments, the data processing service 102 may transmit to the data source an acknowledge message that is associated with the fetching of each data record. For example, the data processing service 102 may transmit the acknowledge message after a set of data records is fetched or stored in the data file. In some embodiments, the acknowledge message may include a timestamp indicating the fetching completion time.

The data processing service 102 determines 630 whether one or more of the data records are duplicated based on the associated message identifiers. The data processing service 102 may access a list of message identifiers from the metadata store, and the list of message identifiers are associated with the data records that were fetched from the data sources previously. The message identifier may be a universal unique identifier (UUID), or any type of metadata that uniquely identifies a message/data record. For example, the message identifier may include metadata such as delivery time, acknowledgement identifier, etc. In some embodiments, the data processing service 102 compares the message identifiers of the newly fetched data records associated with each of the data records against the list of message identifiers. If the data processing service 102 identifies that a message identifier of a newly fetched data record matches to an existing message identifier in the list, the data processing service 102 determines that the corresponding data record is duplicated, i.e., the data record was fetched from the data source and stored in the data store. Alternatively, if the data processing service 102 does not identify a message identifier of a newly fetched data record that matches to any existing message identifier in the list, i.e., the message identifier is "new" to the list, the data processing service 102 may determine that the corresponding data record is not duplicated. In one implementation, the data processing service 102 may add the "new" message identifier to the list of message identifiers to update the list. In this way, the updated list includes the message identifier associated with the newly fetched data record and may be used for future deduplication tasks.

The data processing service 102 generates 640 a second metadata associated with the duplicated data records. The second metadata may include row numbers and the file path that the duplicated data records belong to. For example, the second metadata be in a form of (rowNum, FilePath). In one instance, the second metadata may be grouped by file path to co-locate the row numbers of the duplicated data records for each data file. Based on the grouped second metadata, the data processing service 102 may generate a deletion vector based on the row numbers associated with the duplicated data records. The deletion vector is configured to indicate whether a corresponding data record in the data file is duplicated.

In some embodiments, the data processing service 102 may delete the generated second metadata and/or the deletion vector in a predetermined time period. The data processing service 102 may determine a TTL for each generated metadata. Once the TTL expires, the data processing service 102 may automatically delete the corresponding metadata. In some embodiments, the metadata that comprises the file paths of the duplicated data records may be deleted once the corresponding data records have been processed.

In some embodiments, the data processing service 102 may receive a request to perform an operation on one or more sets of data records. The data processing service 102 may determine whether any of the requested data record is duplicated using the deletion vector. In one example, the data processing service 102 may determines that the operation is requested to be performed on duplicated data records. In this case, the data processing service 102 may skip the operation on the duplicated data records.

Figure 7:
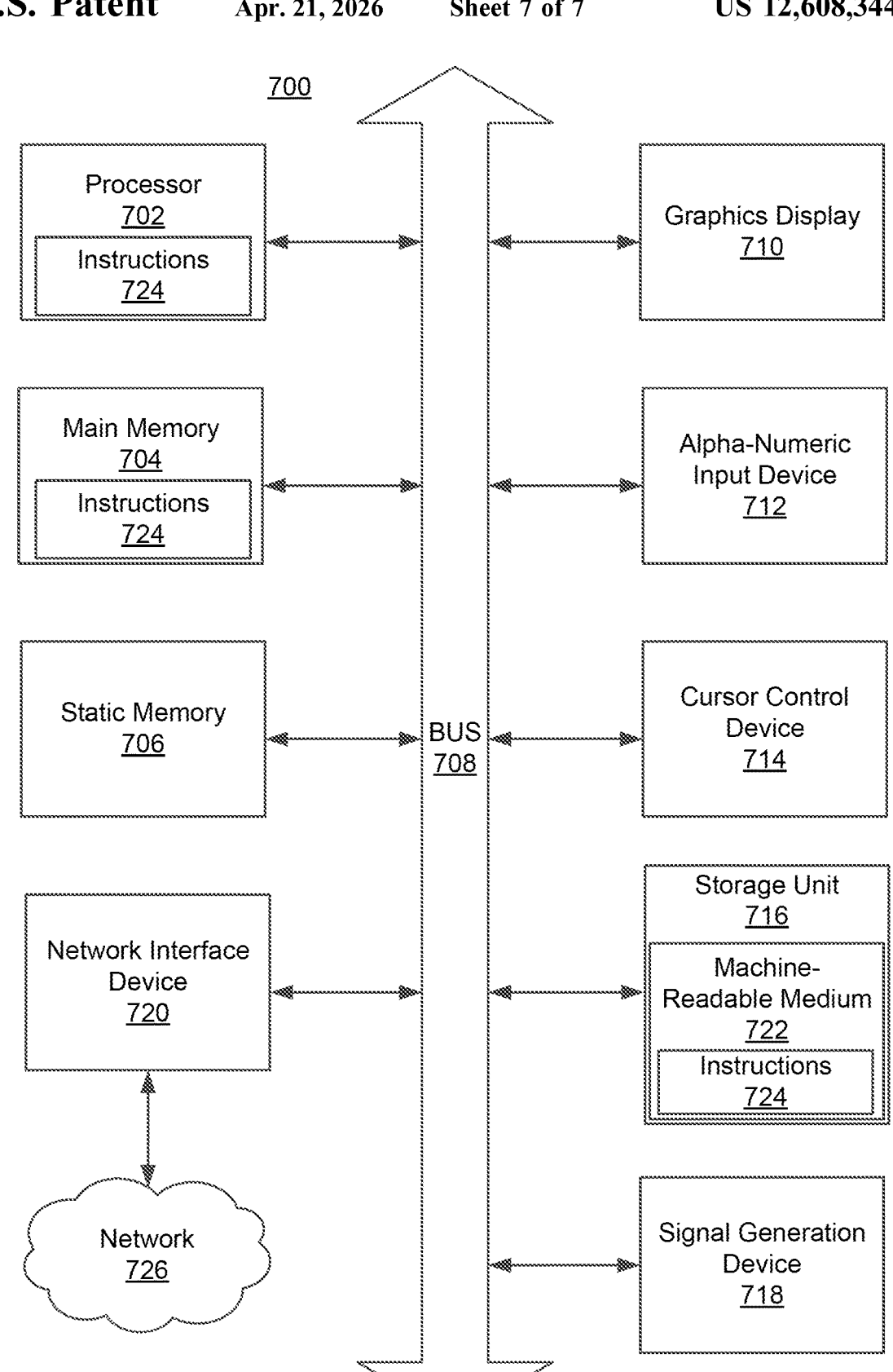
FIG. 7 illustrates an example machine to read and execute computer readable instructions, in accordance with an embodiment.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. The instructions may correspond structuring a processing configuration as described herein to execute the specific functionality as described with FIGS. 1 through 6. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 700. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a system (and/or a method) for using message identifiers for data deduplication. The system may fetch one or more sets of data records from a data source, and each data record is associated with a message identifier. In one instance, the system may subscribe to a data source and fetches the data records using a publish/subscribe (Pub/Sub) messaging service. The system may store the fetched one or more sets of data records in a data file, which is associated with a metadata comprising the message identifier, a file path and a row number for each data record. The system may determine whether one or more of the data records are duplicated based on the associated message identifiers. In response to determining that the one or more data records are duplicated, the system may generate a second metadata comprising the file paths and row numbers associated with the duplicated data records. By using the message identifiers that are associated with the data records, the disclosed configuration keeps track of the fetched data records and stores their corresponding duplication status. In this way, the configuration addresses the problem of the data duplication associated with the Pub/Sub messaging service, saving resources and cost for both the data processing service and the users of the data processing service.

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method comprising:

fetching one or more sets of data records from a data source, each of the data records having a message identifier that uniquely identifies the data record;

storing the data records in respective rows of a data file, wherein the data file is associated with row-level metadata, the row-level metadata comprising, for each of the data records, the message identifier, a file path and a row number;

determining whether one or more of the data records are duplicates based on respective message identifiers in the row-level metadata;

generating, in response to determining that the one or more of the data records are duplicates, a second metadata comprising, for each duplicate data record, the file path and the row number associated with the duplicate data record;

grouping the second metadata based on file paths associated with the duplicate data records;

generating a deletion vector using the grouped second metadata based on row numbers associated with the duplicate data records, wherein the deletion vector comprises a plurality of elements, each element corresponding to a data record indicating whether the corresponding data record in the data file is a duplicate; and skipping the duplicate data records using the generated deletion vector when performing a query operation on the stored data records.

2. The method of claim 1, wherein determining whether one or more of the data records are duplicates comprises:

comparing the message identifier associated with each of the data records against a list of message identifiers, each message identifier in the list is associated with a data record that was fetched from the data source.

3. The method of claim 1, further comprising:

receiving, from a client device, a request to perform an operation on a set of data records;

identifying whether the set of data record includes a duplicate data record using the deletion vector; and performing the operation on the set of data records based on results of the identification.

4. The method of claim 1, further comprising:

transmitting an acknowledge message to the data source after storing the one or more sets of data records in the data file, the acknowledge message comprising a timestamp associated with fetching of the one or more sets of data records.

5. The method of claim 1, further comprising:

automatically deleting the second metadata in a predetermined time period.

6. The method of claim 1, wherein fetching one or more set of data records from the data source comprises:

fetching the one or more sets of data records from the data source via a publish/subscribe (Pub/Sub) messaging service.

7. A non-transitory computer-readable medium comprising stored instructions that when executed by one or more processors of one or more computing devices, cause the one or more computing devices to:

fetch one or more sets of data records from a data source, each of the data records having a message identifier that uniquely identifies the data record;

store the data records in respective rows of a data file, wherein the data file is associated with row-level metadata, the row-level metadata comprising, for each of the data records, the message identifier, a file path and a row number;

determine whether one or more of the data records are duplicates based on respective message identifiers in the row-level metadata;

generate, in response to determining that the one or more of the data records are duplicates, a second metadata comprising, for each duplicate data record, the file path and the row number associated with the duplicate data records record;

group the second metadata based on file paths associated with the duplicate data records;

generate a deletion vector using the grouped second metadata based on row numbers associated with the duplicate data records, wherein the deletion vector comprises a plurality of elements, each element corresponding to a data record indicating whether the corresponding data record in the data file is a duplicate; and skip the duplicate data records using the generated deletion vector when performing a query operation on the stored data records.

8. The non-transitory computer-readable medium of claim 7, wherein the instructions to determine whether one or more of the data records are duplicates comprise stored instructions executable by the one more processors to cause the one or more computing devices to:

compare the message identifier associated with each of the data records against a list of message identifiers, each message identifier in the list is associated with a data record that was fetched from the data source.

9. The non-transitory computer-readable medium of claim 7, wherein the instructions that when executed by one or more processors of one or more computing devices, further cause the one or more computing devices to:

receive, from a client device, a request to perform an operation on a set of data records;

identify whether the set of data record includes a duplicate data record using the deletion vector; and perform the operation on the set of data records based on results of the identification.

10. The non-transitory computer-readable medium of claim 7, wherein the instructions that when executed by one or more processors of one or more computing devices, further cause the one or more computing devices to:

transmit an acknowledge message to the data source after storing the one or more sets of data records in the data file, the acknowledge message comprising a timestamp associated with fetching of the one or more sets of data records.

11. The non-transitory computer-readable medium of claim 7, wherein the instructions that when executed by one or more processors of one or more computing devices, further cause the one or more computing devices to:

automatically delete the second metadata in a predetermined time period.

12. The non-transitory computer-readable medium of claim 7, wherein the instructions to fetch one or more set of data records from the data source comprise stored instructions executable by the one more processors to cause the one or more computing devices to:

fetch the one or more sets of data records from the data source via a publish/subscribe (Pub/Sub) messaging service.

13. A system comprising:

one or more computer processors; and one or more computer-readable mediums storing instructions that, when executed by the one or more computer processors, cause the system to:

fetch one or more sets of data records from a data source, each of the data records having a message identifier that uniquely identifies the data record;

store the data records in respective rows of a data file, wherein the data file is associated with row-level metadata, the row-level metadata comprising, for each of the data records, the message identifier, a file path and a row number;

determine whether one or more of the data records are duplicates based on respective message identifiers in the row-level metadata;

generate, in response to determining that the one or more of the data records are duplicates, a second metadata comprising, for each duplicate data record, the file path and the row number associated with the duplicate data record;

group the second metadata based on file paths associated with the duplicated duplicate data records;

generate a deletion vector using the grouped second metadata based on row numbers associated with the duplicate data records, wherein the deletion vector comprises a plurality of elements, each element corresponding to a data record indicating whether the corresponding data record in the data file is a duplicate; and skip the duplicate data records using the generated deletion vector when performing a query operation on the stored data records.

14. The system of claim 13, wherein the instructions to determine whether one or more of the data records are duplicates further comprise stored instructions executed by the one or more computer processors to cause the system to:

compare the message identifier associated with each of the data records against a list of message identifiers, each message identifier in the list is associated with a data record that was fetched from the data source.

15. The system of claim 13, wherein the instructions that, when executed by the one or more computer processors, cause the system to:

receive, from a client device, a request to perform an operation on a set of data records;

identify whether the set of data record includes a duplicate data record using the deletion vector; and perform the operation on the set of data records based on results of the identification.

16. The system of claim 13, wherein the instructions that, when executed by the one or more computer processors, cause the system to:

transmit an acknowledge message to the data source after storing the one or more sets of data records in the data file, the acknowledge message comprising a timestamp associated with fetching of the one or more sets of data records.

17. The system of claim 13, wherein the instructions to fetch one or more set of data records from the data source further comprise stored instructions executed by the one or more computer processors to cause the system to:

fetch the one or more sets of data records from the data source via a publish/subscribe (Pub/Sub) messaging service.

* * * * *